US006400713B1

(12) United States Patent
Thomas et al.

(10) Patent No.: US 6,400,713 B1
(45) Date of Patent: Jun. 4, 2002

(54) INTEGRATED ELEMENT MANAGER AND INTEGRATED MULTI-SERVICES ACCESS PLATFORM

(75) Inventors: Shaji A. Thomas, McKinney; Paul R. Frazier, Dallas; David E. Austin; Andrew M. Walding, both of Plano; Clemente G. Garcia, Garland, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/342,740

(22) Filed: Jun. 29, 1999

Related U.S. Application Data

(60) Provisional application No. 60/091,370, filed on Jun. 30, 1998.

(51) Int. Cl.$^7$ .......................... H04L 12/66; H04M 17/00
(52) U.S. Cl. ....................... 370/355; 370/386; 379/219; 709/229; 709/249
(58) Field of Search ................................ 370/466, 468, 370/467, 355, 523; 379/221, 34, 219; 709/227, 223, 200, 249, 229

(56) References Cited

U.S. PATENT DOCUMENTS

| 4,685,101 A | 8/1987 | Segal et al. .................. 370/468 |
| 5,337,306 A | 8/1994 | Hall ............................. 370/249 |
| 5,434,850 A | 7/1995 | Fielding et al. ............. 370/321 |

(List continued on next page.)

FOREIGN PATENT DOCUMENTS

| EP | 0 849 911 A2 | 6/1998 | |
| GB | 2280337 | 1/1995 | ............. H04J/3/00 |
| GB | 2305812 | 4/1997 | |

OTHER PUBLICATIONS

Matsuura, et al., "Architecture and Network Configuration of the Service Platform Oriented Fiber Access Network", International Conference on Communications (ICC), U.S. New York, IEEE, 1994, pp. 1077–1081.

Zitzen, W. "Gesteuerte Allianz Heterogener Systeme and Netze", Telcom Report, vol. 18, No. 6, Nov. 1, 1995, pp. 306–307.

Cranfill N.K. et al., "Emerging Technologies for the Control of the Defense Red Switch Network (DRSN)", Proceedings of the Military Communications Conference (MILCOM), Long Beach, NJ., Oct. 2–5, 1994, vol. 2, pp. 664–668.

(List continued on next page.)

*Primary Examiner*—Ajit Patel
*Assistant Examiner*—John Pezzlo
(74) *Attorney, Agent, or Firm*—Baker Botts L.L.P.

(57) ABSTRACT

An integrated multi-services access platform includes a time division multiplex interface coupled to a time division multiplex network, a matrix in communications with the time division multiplex interface, a frame relay groomer coupled to the matrix, an asynchronous transfer mode matrix coupled to the frame relay groomer, and an asynchronous transfer mode interface coupled to a frame relay/asynchronous transfer mode network. The integrated multi-services access platform may further include an integrated element manager, which includes a centralized management system coupled to a time division multiplex operational support system, a frame relay/asynchronous transfer mode network management system interworking unit coupled to at least one frame relay/asynchronous transfer mode network management system, an element management function unit operable for service provisioning, fault management, element and network monitoring, and metric measurements, an element management database having service and network configurations, status, and billing information, a simple network management protocol unit, and at least one application program interface coupled to at least one telecommunications element.

22 Claims, 6 Drawing Sheets

U.S. PATENT DOCUMENTS

| | | | | |
|---|---|---|---|---|
| 5,490,252 A | * | 2/1996 | Macera et al. | 709/249 |
| 5,499,241 A | | 3/1996 | Thompson et al. | 370/486 |
| 5,691,976 A | | 11/1997 | Engdahl et al. | 370/242 |
| 5,734,654 A | | 3/1998 | Shirai et al. | 370/396 |
| 5,742,762 A | * | 4/1998 | Scholl et al. | 709/200 |
| 5,903,559 A | * | 5/1999 | Acharya et al. | 370/355 |
| 5,982,783 A | * | 11/1999 | Frey et al. | 370/467 |
| 5,987,513 A | * | 11/1999 | Prithviraj et al. | 709/223 |
| 6,009,106 A | * | 12/1999 | Rustad et al. | 370/523 |
| 6,018,567 A | * | 1/2000 | Dulman | 379/34 |
| 6,070,192 A | * | 5/2000 | Holt et al. | 709/227 |
| 6,084,892 A | * | 7/2000 | Benash et al. | 379/221 |

OTHER PUBLICATIONS

Hutstein, J. et al., "Alllianz zur Netzevolution", Telecom Report, vol. 17, No. 1, Jan. 1, 1994 pp. 30–33.

Banerjee, S., et al., "Carrier and Customer Management of Fast Packet Services and ATM", Proceedings of the Network Operations and Management Symposium, Feb. 14–17, 1994, vol. 2, SYMP. 4, pp. 576–586.

S.P. Ferguson, "Implications of Sonet and SDH", Electronics & Communication Engineering Journal, Jun. 1994, pp. 133–142.

* cited by examiner

INTEGRATED ELEMENT MANAGER AND INTEGRATED MULTI-SERVICES ACCESS PLATFORM

RELATED PATENT APPLICATIONS

This application is related to U.S. patent application entitled "System, Device, and Method for Consolidating Frame Information into a Minimum Number of Output Links", Ser. No. 08/777,775, filed on Dec. 31, 1997, by Shaji A. Thomas et al. This application is incorporated herein by reference.

The present application claims benefit to U.S. Provisional Application Serial No. 60/091,371 filed Jun. 30, 1998.

TECHNICAL FIELD OF THE INVENTION

This invention is related in general to the field of telecommunications equipment. More particularly, the invention is related to an integrated element manager and an integrated multi-services access platform performing grooming, switching and multiplexing on multiple services and data rates.

BACKGROUND OF THE INVENTION

Frame relay (FR) service providers, as well as asynchronous transfer mode (ATM) service providers, require a sufficient number of data ports in order to provide frame relay and asynchronous transfer mode services. However, these data ports are extremely expensive to obtain compared to ports for a conventional cross-connect systems. Further, time division multiplexed (TDM) links that provide access to frame relay services are extremely under-utilized due to the bursty nature of the information being transferred. The frame relay traffic is carried on fully allocated digital circuits such as DS-0, nxDS-0, T1, E1, T3, E3, et al. As a result, the variable bit rate characteristic of the frame relay traffic is not effectively exploited.

SUMMARY OF THE INVENTION

Therefore, it has become desirable to improve the efficiency of frame relay traffic transfer that would reduce the number of frame relay or asynchronous transfer mode ports required by the service provider and further coordinate and consolidate the management systems thereof. With an integrated element manager that manages an integrated multi-services access platform that provides data grooming and multiplexing, customer responsiveness is improved with shorter service provisioning time. Furthermore, operation costs of network management systems is also reduced.

In one aspect of the invention, an integrated multi-services access platform includes a time division multiplex interface coupled to a time division multiplex network, a matrix in communications with the time division multiplex interface, a frame relay groomer coupled to the matrix, an asynchronous transfer mode matrix coupled to the frame relay groomer, and an asynchronous transfer mode interface coupled to a frame relay/asynchronous transfer mode network.

In another aspect of the invention, an integrated element manager includes a centralized management system coupled to a time division multiplex operational support system, a frame relay/asynchronous transfer mode network management system interworking unit coupled to at least one frame relay/asynchronous transfer mode network management system, an element management function unit operable for service provisioning, fault management, element and network monitoring, and metric measurements, an element management database having service and network configurations, status, and billing information, a simple network management protocol unit, and at least one application program interface coupled to at least one telecommunications element.

BRIEF DESCRIPTION OF THE DRAWINGS

For a better understanding of the present invention, reference may be made to the accompanying drawings, in which.

DETAILED DESCRIPTION OF THE INVENTION

Figure 1:
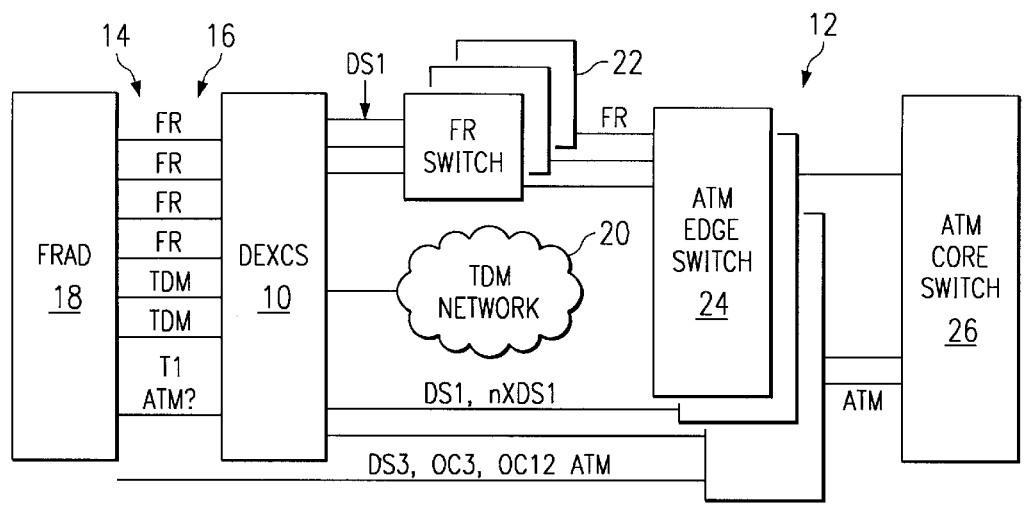
FIG. 1 is a block diagram of current architecture of telecommunications equipment for multiple services access.

The preferred embodiments of the present invention are illustrated in FIGS. 1–13, like reference numerals being used to refer to like and corresponding parts of the various drawings.

FIG. 1 is a block diagram of a digital cross-connect system 10 within a telecommunications network 12. Telecommunications network 12 preferably provides a frame relay permanent virtual connection exchange service. In a frame relay permanent virtual connection service, variable length frames are relayed from the source to the desired destination by means of permanent virtual connections.

Each frame is addressed by a unique data link connection identifier which is associated with a particular permanent virtual connection connecting two end systems. Permanent virtual connections that define the logical paths between endpoints in a customer's network are established at service subscription time through administrative procedures.

In the downstream direction, digital cross-connect system 10 receives individual DS0 signals carried over T1 links 14 and/or multiple DS0 signals carried over FT1 links 16 from frame relay assembly/disassembly devices 18 of frame relay customers. Digital cross-connect system 10 performs switching on time division multiplexed (TDM) traffic and provides access to frame relay (FR) and asynchronous transfer mode (ATM) services. Digital cross-connect system 10 is coupled to time division multiplexed networks 20 and frame relay switches 22. Frame relay switches 22 are in turn coupled to asynchronous transfer mode edge switches 24 relaying frame relay data traffic. Asynchronous transfer mode edge switches 24 are then coupled to an asynchronous core switch 26. It may be seen that in this network configuration, access to frame relay service is on private lines using digital cross-connect systems 10 via time division multiplexed circuits or links. Furthermore, studies have shown that a great majority of frame relay traffic requires network visibility at the DS0 level. Therefore, it would be advantageous to integrate the functionality of frame relay switching and data grooming into digital cross-connect system 10, as shown in FIG. 2.

Figure 2:
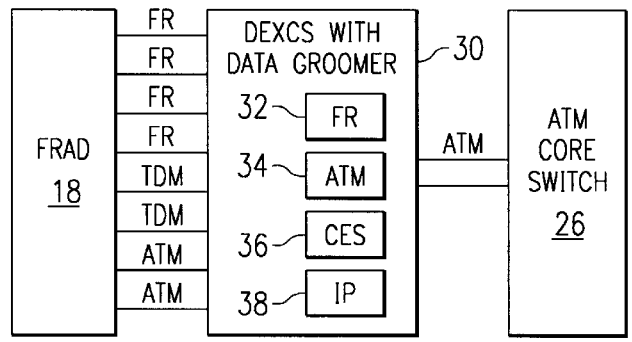
FIG. 2 is an architecture block diagram of an integrated multi-services access platform according to the teachings of the present invention.

FIG. 2 is an architecture block diagram of a digital cross-connect system 30 performing data grooming for multiple data services according to the teachings of the present invention. Digital cross-connect system 30 includes a frame relay data groomer 32, an asynchronous transfer mode data groomer 24, and components for a circuit emulation system (CES) 36 and internet protocol (IP) 38. Digital cross-connect system 30 is then directly coupled to asynchronous transfer mode core switch 26. In this configuration, digital cross-connect system 30 extracts the frames making up the frame relay traffic from the DS0 signals and consolidates the frames by multiplexing them into DS1 signals. Similarly, digital cross-connect system 30 also grooms asynchronous transfer mode traffic.

Figure 3:
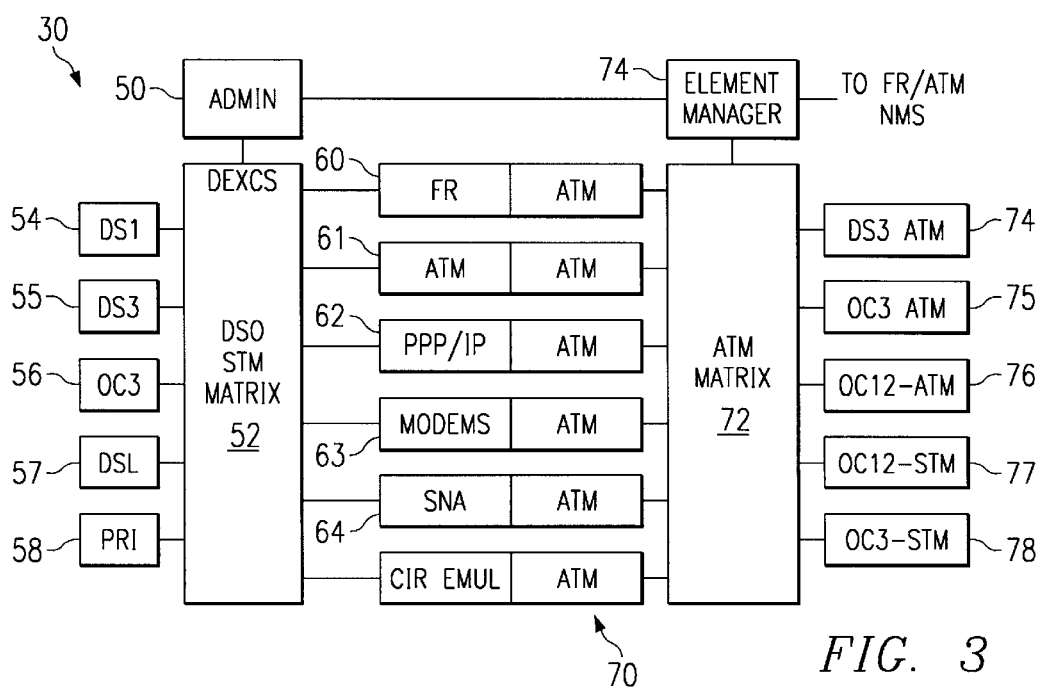
FIG. 3 is a more detailed architecture block diagram of an integrated multi-services access platform performing data grooming, switching and multiplexing according to the teachings of the present invention.

FIG. 3 is a more detailed architecture block diagram of a digital cross-connect system 30 performing frame relay and asynchronous transfer mode data grooming and switching according to the teachings of the present invention. Digital cross-connect system 30 includes an administration system 50 coupled to the DS0 synchronous transfer mode (STM) matrix 52. Matrix 52 receives data traffic of various rates and types, including DS1 54, DS3 55, OC3 56, digital subscriber line (DSL) 57, and primary rate interface (PRI) 58. The data traffic are then switched and provided to various functional subsystems 60–65 for performing data grooming and other functionalities, including a frame relay subsystem 60, an asynchronous transfer mode subsystem 61, an internet protocol (PPP/IP) subsystem 62, modems 63, SNA 64, and a circuit emulation subsystem 65. These subsystems may be used to convert data traffic to asynchronous transfer mode 70, which is provided to an asynchronous transfer mode matrix 72. An integrated element manager 74 is coupled to administration system 50, asynchronous transfer mode matrix 72, and other network managers to provide coordinated management of digital cross-connect system 30 for service provisioning, fault isolation, and system monitoring. Data traffic, of various rates including DS3 ATM 74, OC3 ATM 75, OC12 ATM 76, OC12 STM 77, and OC3 STM 78 are provided downstream of asynchronous transfer mode matrix 72.

Described below and shown in FIGS. 4–13 is an evolution path to integrate the digital cross-connect system and other data grooming subsystems and the accompanying network management functionality.

Figure 4:
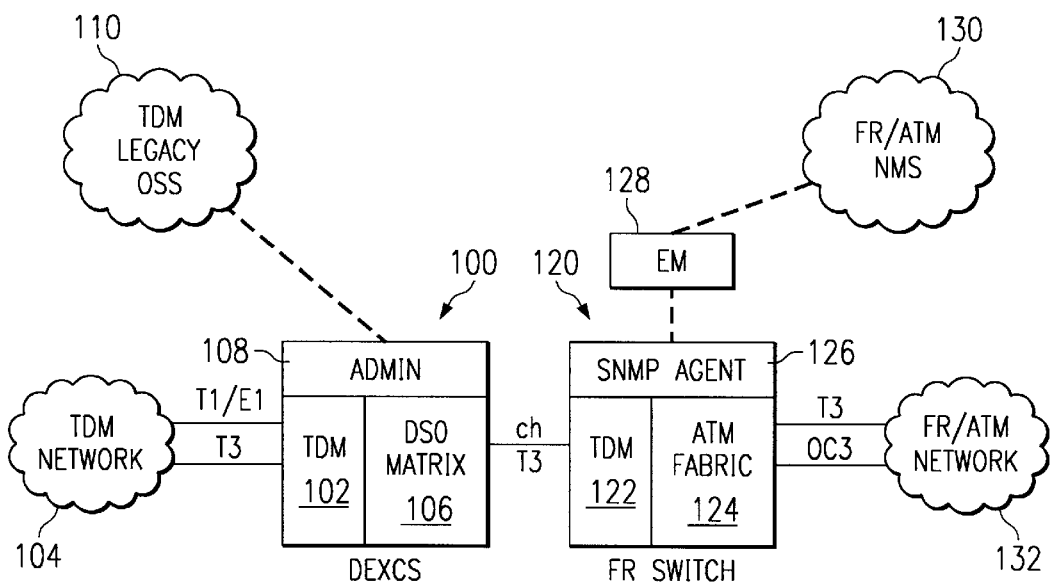
FIG. 4 is a block diagram of a cross-connect system connected to a frame relay switch.

FIG. 4 is a block diagram of a cross-connect system 100 connected to a frame relay switch 120. The configuration shown in FIG. 4 is typical of existing systems in which digital cross-connect systems are used to access frame relay and asynchronous transfer mode networks 132. Digital cross-connect system 100 includes a time division multiplex interface 102 coupled to a time division multiplexed network 104, and a DS0 matrix 106 coupled to time division multiplex interface 102. Time division multiplex interface 102 is used to interface with time division multiplex network 104 and is operable to relay T1, E1, and T3 data traffic. An administration subsystem 108 is coupled to time division multiplex interface 102 and DS0 matrix 106 as well as time division multiplex legacy operational support system 110. Time division multiplex legacy operational support system 110 controls and manages digital cross-connect system 100.

Frame relay switch 120 includes a time division multiplex interface 122 coupled to an asynchronous transfer mode fabric 124. A Simple Network Management Protocol (SNMP) agent 126 is coupled to both time division multiplex ports 122 and asynchronous transfer mode fabric 124. Asynchronous transfer mode fabric 124 interfaces with frame relay and asynchronous transfer mode networks 132, and is operable to relay T3 and OC3 data traffic. An element manager (EM) 128 controls and performs service provisioning for frame relay switch 120. Element manager 128 is coupled to frame relay and asynchronous transfer mode network management system 130. Constructed and operating in this manner, multiple management systems are used and coordination between the management systems and the control and management of the time division multiplex and frame relay and asynchronous transfer mode networks is difficult and must be done manually. Because the management systems are not coordinated, with one managing the frame relay/asynchronous transfer mode logical plane and one managing the time division multiplex physical plane. Therefore, service provisioning is slow and cannot be automated. The result is high operation and support costs.

Figure 5:
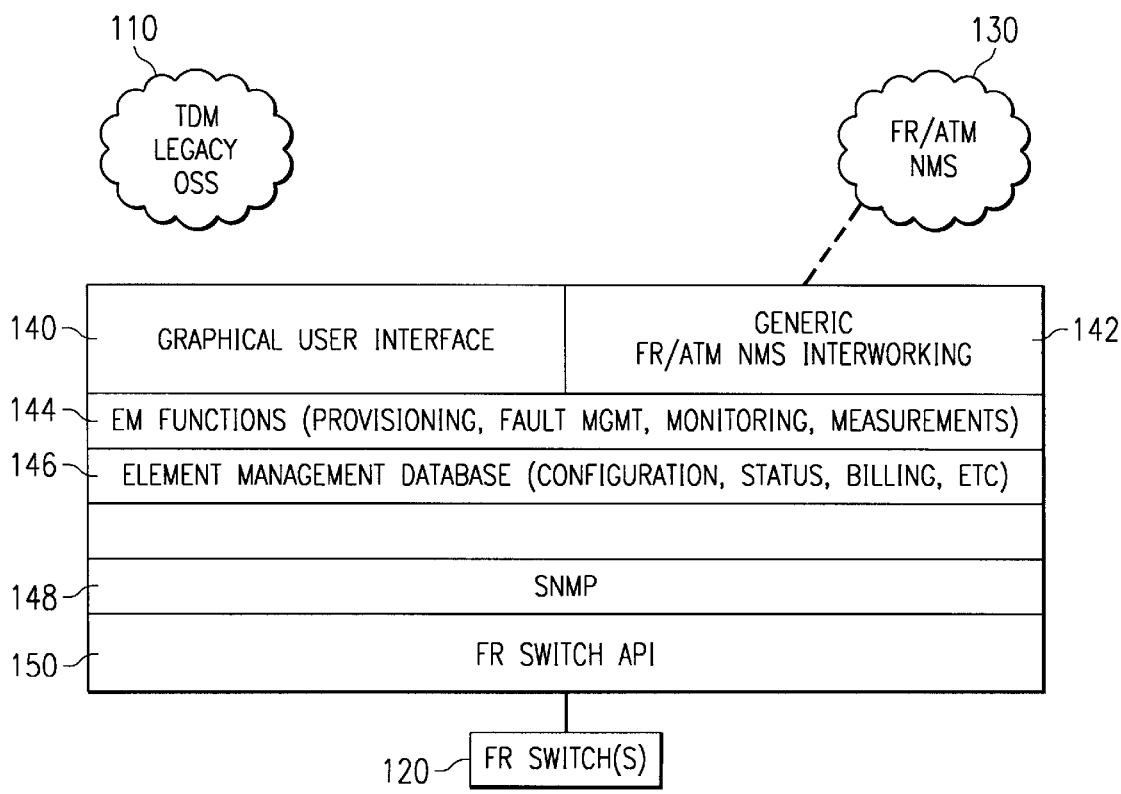
FIG. 5 is a more detailed diagram of the system components of the element manager shown in FIG. 4.

FIG. 5 is a more detailed diagram of the system components of element manager 128 shown in FIG. 4. Element manager 128 has a layered architecture, which includes a graphical user interface 140, a generic frame relay/asynchronous transfer mode network management system interworking unit 142, an element manager functions unit 144, an element management database 146, an Simple Network Management Protocol unit 148, and a frame relay switch application program interface (API) 150. Element manager functions unit 144 is operable to perform service provisioning, fault management, system and network monitoring, and obtain system and network metric measurements. Element management database 146 contains configuration data, status, billing information, etc.

Figure 6:
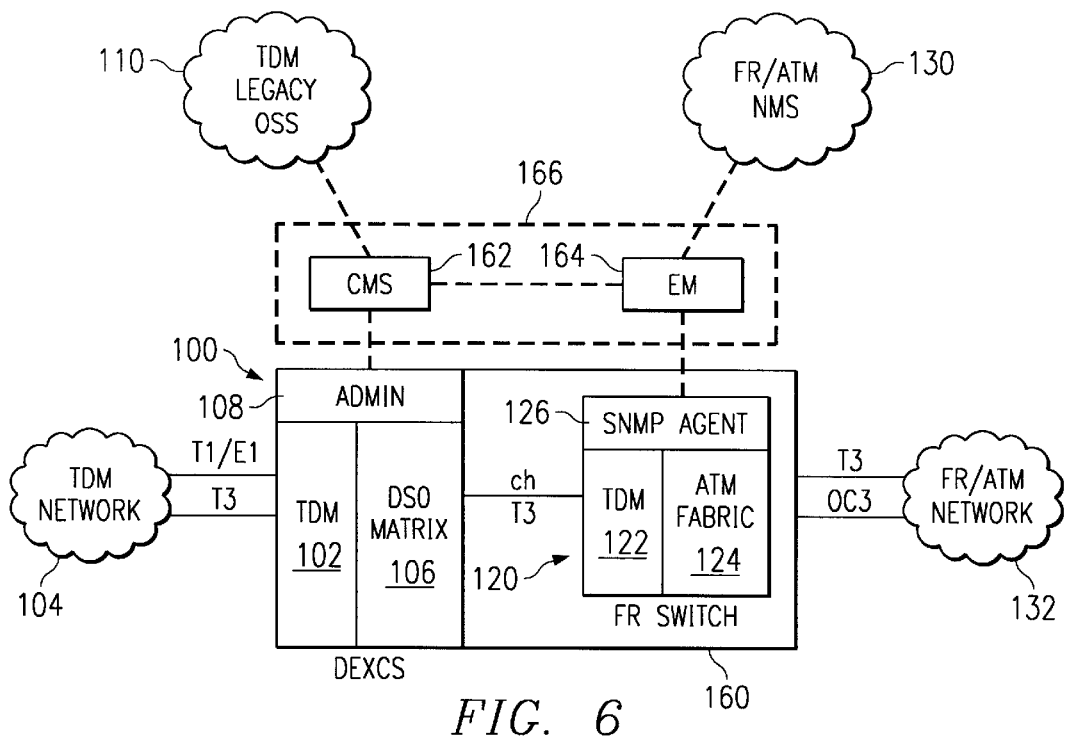
FIG. 6 is a block diagram of a more integrated cross-connect system connected to a frame relay switch and separate management systems thereof according to the teachings of the present invention.

FIG. 6 is a block diagram of a more integrated multi-services access platform 160 managed by two separate management systems 162 and 164 thereof according to the teachings of the present invention. Integrated multi-services access platform 160 represents a small step down the evolution path toward total integration. In system 160, frame relay functionality or frame relay switch 120 is incorporated into the digital cross-connect system. A channelized T3 span couples cross-connect system 100 and frame relay switch 120. Cross-connect system 100 includes an administration unit 108 coupled to time division multiplex interface 102 and a DS0 matrix 106. Frame relay switch 120 includes a Simple Network Management Protocol (SNMP) agent 126, a time division multiplex interface 122 and an asynchronous transfer mode fabric 124. However, a management system 166 consisting of two separate management systems 162 and 164 are still employed. A Centralized Management System 162 is coupled to administration subsystem 108 of the digital cross-connect system, and an element manager 164 is coupled to Simple Network Management Protocol agent 126 of frame relay switch 126. Although two separate management systems 162 and 164 are used, there is direct communications therebetween.

Figure 7:
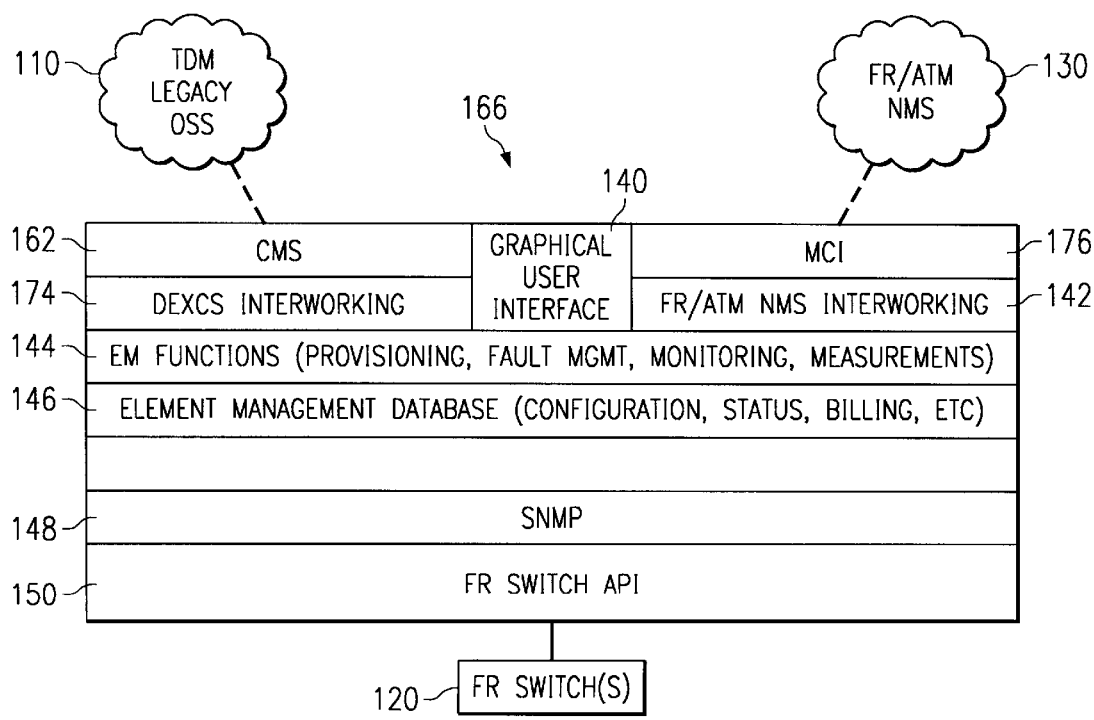
FIG. 7 is a more detailed diagram of the system components of the element manager systems shown in FIG. 6 according to the teachings of the present invention.

FIG. 7 is a more detailed diagram of the system components of management system 166 shown in FIG. 6 according to the teachings of the present invention. Management system 166 has a layered architecture, which includes a centralized management system 166 (BASiS), a graphical user interface 140, an MCI network management system-specific interworking unit 176, a digital cross-connect system interworking unit 174, a generic frame relay/asynchronous transfer mode network management system interworking unit 142, an element manager functions unit 144, an element management database 146, a Simple Network Management Protocol 148, and a frame relay switch application program interface (API) 150.

Figure 8:
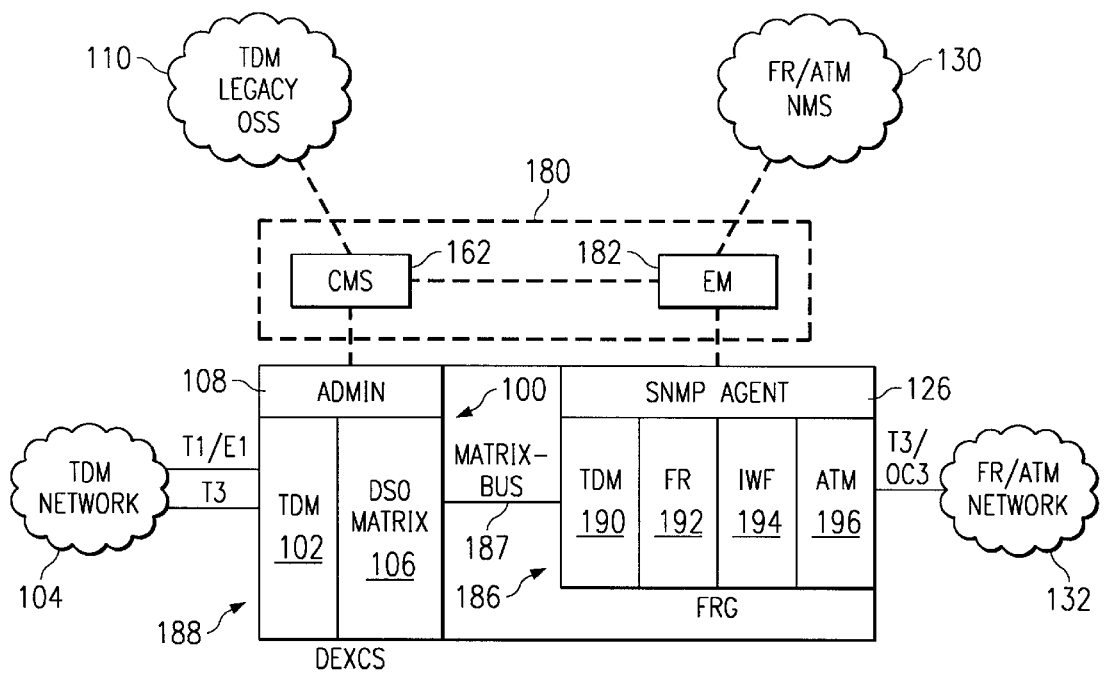
FIG. 8 is a block diagram of a more integrated cross-connect system connected to a frame relay switch according to the teachings of the present invention.

FIG. 8 is a block diagram of a more integrated digital cross-connect system 188 having a cross-connect system 100 with a frame relay groomer (FRG) 186 and controlled by a management system 180 according to the teachings of the present invention. Cross-connect system 100 is coupled to frame relay groomer 186 via a matrix bus 187. Management system 180 includes a centralized management system 162 and an element manager 182. Digital cross-connect system 100 includes time division multiplex interface 102, DS0 matrix 106, and administration unit 108. Frame relay groomer 186 includes a Simple Network Management Protocol agent 126, a time division multiplex interface 186, a frame relay switch 192, an interworking function (IWF) unit 194, and an asynchronous transfer mode interface 196. Constructed in this manner, digital cross-connect system 188 has the capability for data grooming and multiplexing of frame relay and asynchronous transfer mode traffic.

Figure 9:
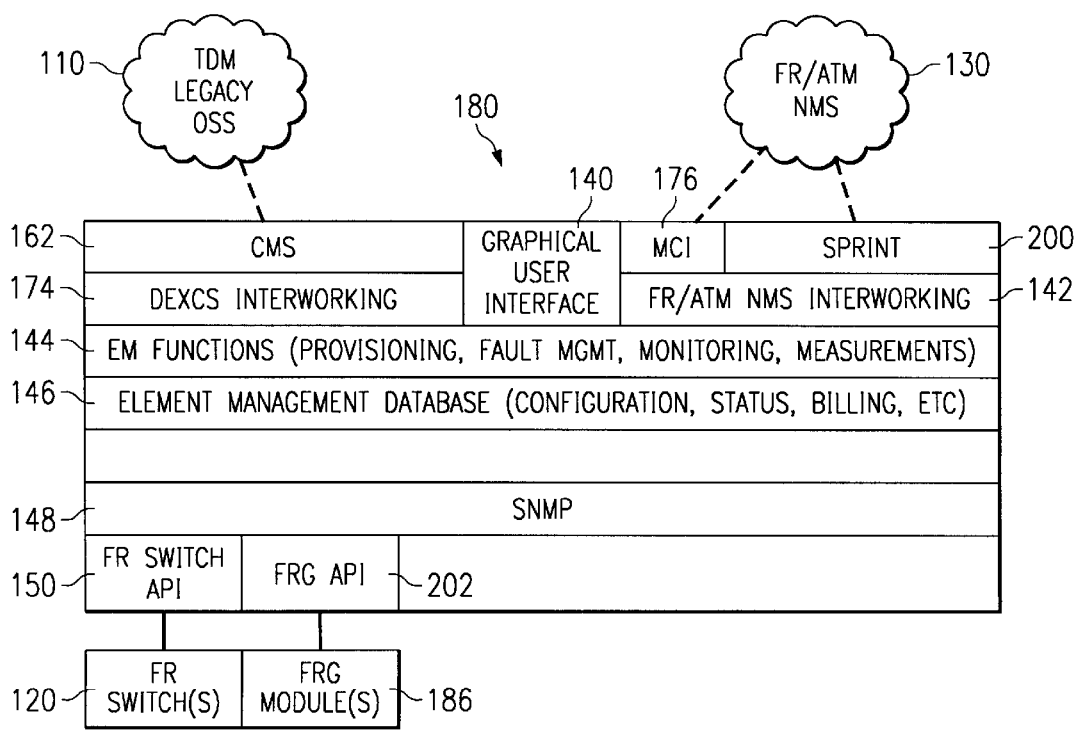
FIG. 9 is a more detailed diagram of the system components of the element manager systems shown in FIG. 8 according to the teachings of the present invention.

FIG. 9 is a more detailed diagram of the layered architecture of management system 180 shown in FIG. 8 according to the teachings of the present invention. Management system 180 includes a centralized management system 162 (BASiS), a graphical user interface 140, an MCI network management system-specific interworking unit 176, a Sprint network management system-specific interworking unit 200, a digital cross-connect system interworking unit 174, a generic frame relay/asynchronous transfer mode network management system interworking unit 142, an element manager functions unit 144, an element management database 146, a Simple Network Management Protocol unit 148, a frame relay switch application program interface (API) 150, and a frame relay groomer application program interface 202.

Figure 10:
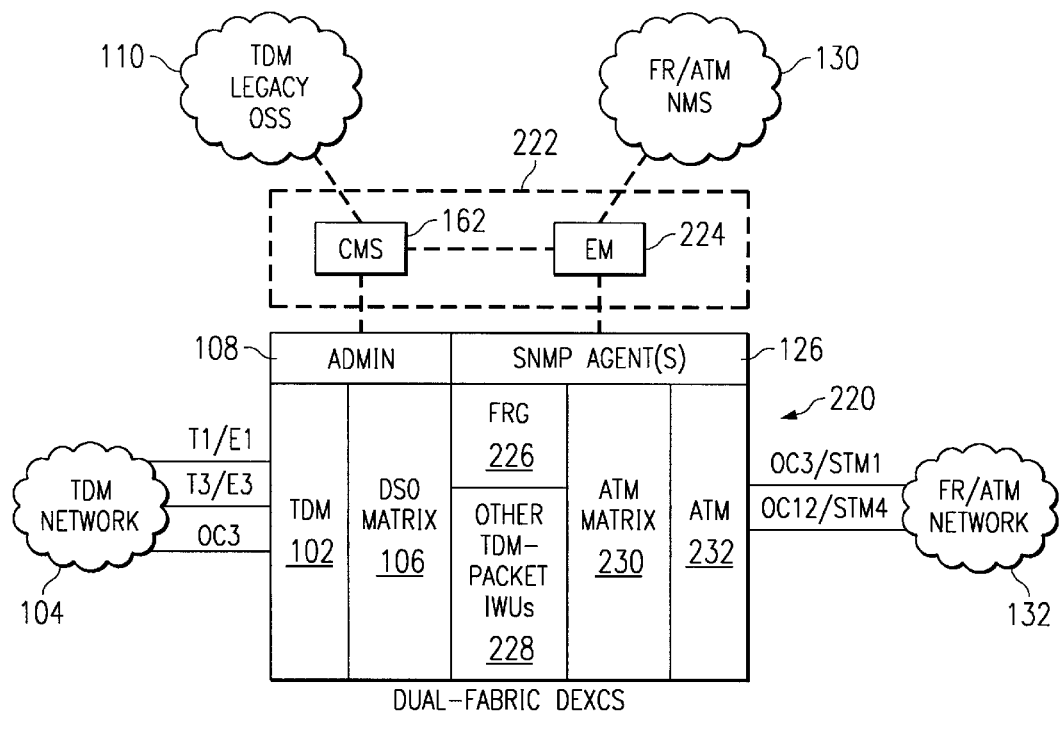
FIG. 10 is a block diagram of an integrated cross-connect system performing frame relay switching and data grooming function according to the teachings of the present invention.

FIG. 10 is a block diagram of a dual fabric cross-connect system 220 performing DS0 switching, frame relay grooming, and asynchronous transfer mode switching functions according to the teachings of the present invention. Dual fabric cross-connect system 220 includes administration unit 108, a time division multiplex interface 102, a DS0 matrix 106, a frame relay groomer 226, an asynchronous transfer mode matrix 230, other time division multiplex-packet interworking units (IWUs) 228, and an asynchronous transfer mode interface 232. Time division multiplex interface 102 is operable to relay data traffic at T1/E1, T3/E3, and OC3 rates. Asynchronous transfer mode interface 232 is operable to relay data traffic at OC3/STM1 and OC12/STM4 rates. Dual fabric cross-connect system 220 is controlled by a management system 222 which includes a centralized management system 162 and an element manager 224 according to the teachings of the present invention.

Figure 11:
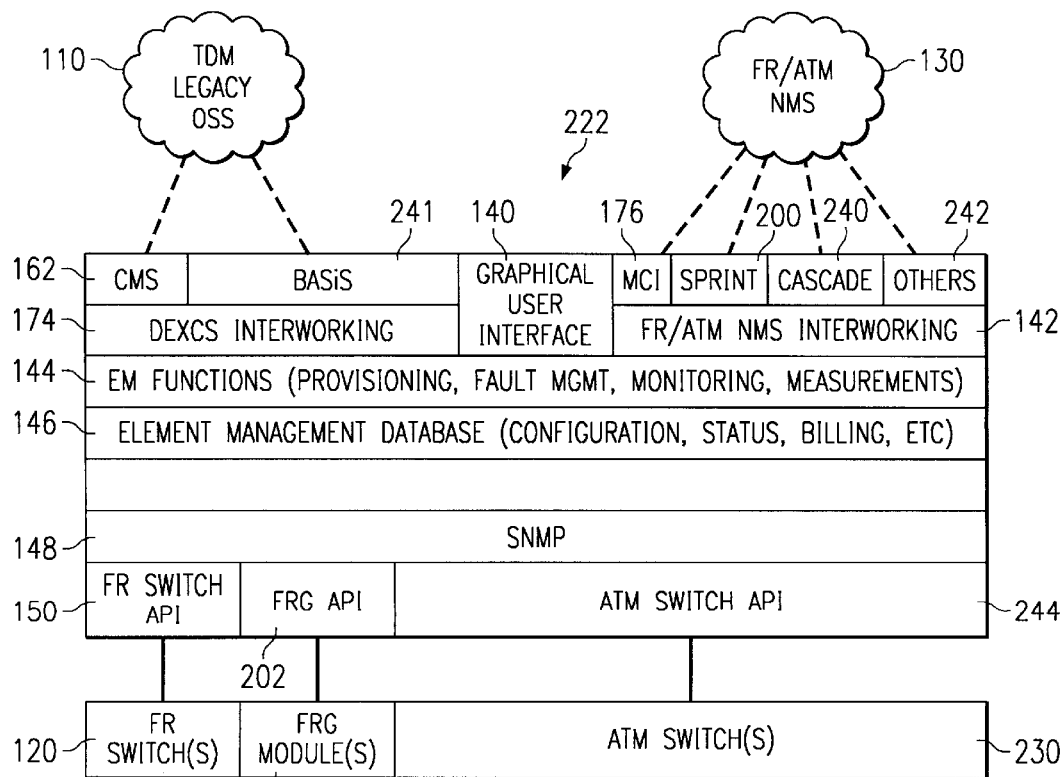
FIG. 11 is a more detailed diagram of the system components of the element manager systems shown in FIG. 10 according to the teachings of the present invention.

FIG. 11 is a more detailed diagram of the layered architecture of a management system 222 shown in FIG. 10 according to the teachings of the present invention. Management system 222 includes a centralized management system 162 (and also a specific embodiment of a centralized management system called BASiS 241), a graphical user interface 140, an MCI network management system-specific interworking unit 176, a Sprint network management system-specific interworking unit 200, a Cascade network management interworking unit 240, other network management system interworking units 242, a digital cross-connect system interworking unit 174, a generic frame relay/asynchronous transfer mode network management system interworking unit 142, an element manager functions unit 144, an element management database 146, a Simple Network Management Protocol unit 148, a frame relay switch application program interface (API) 150, a frame relay groomer application program interface 202, and an asynchronous transfer mode switch application program interface 244.

Figure 12:
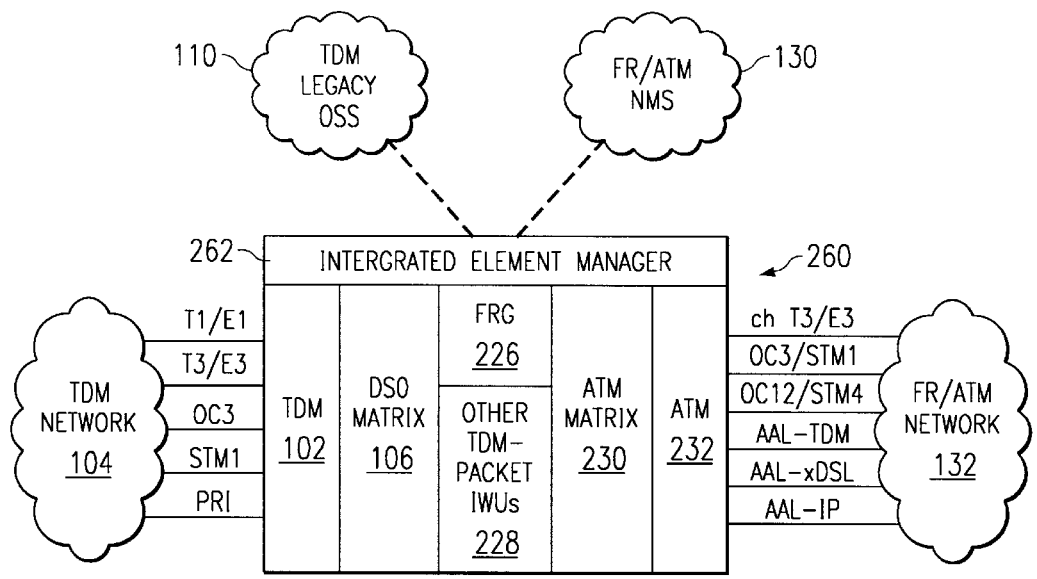
FIG. 12 is a block diagram of an integrated cross-connect system performing frame relay switching and data grooming function controlled by an integrated element manger according to the teachings of the present invention.

FIG. 12 is a block diagram of an integrated multi-services access platform 260 performing frame relay switching and data grooming function controlled by an integrated element manger 262 according to the teachings of the present invention. Integrated multi-services access platform 260 includes an integrated element manager 262, time division multiplex interface 102, DS0 matrix 106, frame relay groomer 226, asynchronous transfer mode matrix 230, other time division multiplex-packet interworking units 228, and asynchronous transfer mode interface 232. Time division multiplex interface 102 is used to interface with time division multiplex networks 104 and is operable to relay data traffic at T1.E1, T3/E3, OC3, STM1, and primary rate interface (PRI) rates and formats. Asynchronous transfer mode interface 232 is used to interface with frame relay/asynchronous transfer mode networks 132 and is operable to relay data traffic at channelized T3/E3, OC3/STM1, OC12/STM4, AAL-TDM, AAL-xDSL, and AAL-IP rates and formats.

Figure 13:
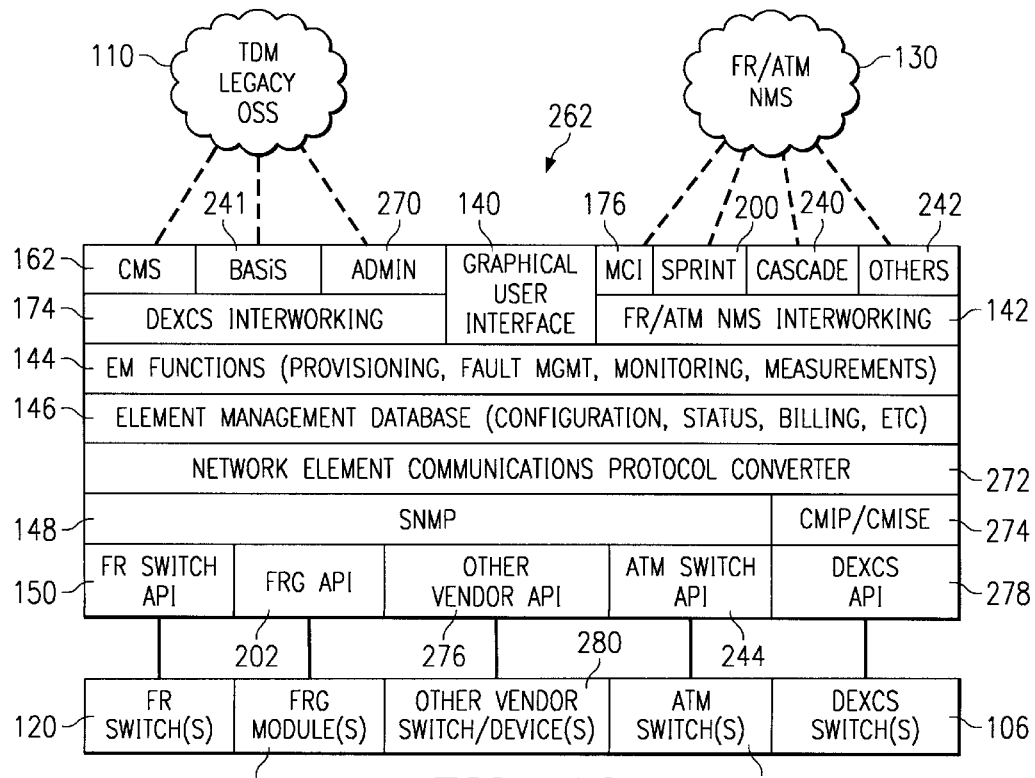
FIG. 13 is a more detailed diagram of the system components of the integrated element manager shown in FIG. 12 according to the teachings of the present invention.

FIG. 13 is a more detailed diagram of the layered architecture of integrated element manager 262 shown in FIG. 12 according to the teachings of the present invention. Management system 262 includes a centralized management system 162 (and also a specific embodiment of a centralized managment system called BASiS 241), a cross-connect switch administration unit 270, a graphical user interface 140, an MCI network management system-specific interworking unit 176, a sprint network management system-specific interworking unit 200, a Cascade network management interworking unit 240, other network management system interwoking units 242, a digital cross-connect system interworking unit 174, a generic frame relay/asynchronous transfer mode network management system interworking unit 142, an element manager functions unit 144, an element management database 146, a network element communications protocol converter 272, a Simple Network Management Protocol unit 148, a CMIP/CMISE (common management information protocol/common management information service element) unit 274, a frame relay switch application program interface (API) 150, a frame relay groomer application program interface 202, application program interface 276 to other vendors of switches or other telecommunications equipment 280, an asynchronous transfer mode switch application program interface 244, and an application program interface 278 to digital cross-connect matrix 106.

Constructed in this manner, network management of time division multiplex access to frame relay and asynchronous transfer mode networks is integrated into the integrated element manager, so that coordinated management in the logical as well as the physical plane is possible. Furthermore, private line, frame relay and asynchronous transfer mode network management can be consolidated. This integrated configuration directly translates to improved customer responsiveness and reduced operations costs to telephone companies.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. An integrated element manager, comprising:
   a centralized management system coupled to a time division multiplex operational support system, the centralized management system operable to provide control and management of a time division multiplex network for transfer of telecommunications traffic over a physical plane according to the time division multiplex operational support system;
   a frame relay/asynchronous transfer mode network management system interworking unit coupled to at least one frame relay/asynchronous transfer mode network management system, the frame relay/asynchronous transfer mode network management system operable to provide control and management of the telecommunications traffic over a logical plane;
   an element management function unit operable for service provisioning, fault management, element and network monitoring, and metric measurements of the telecommunications traffic;
   an element management database having service and network configurations, status, and billing information for use by the element management function unit;
   a simple network management protocol unit operable to provide interfacing for the telecommunications traffic between the time division multiplexed network and the frame relay/asynchronous transfer mode network; and
   at least one application program interface coupled to at least one telecommunications element and operable to control grooming and multiplexing of the telecommunications traffic in order to reduce a number of required ports.

2. The integrated element manager, as set forth in claim 1, further comprising a network element communications protocol converter.

3. The integrated element manager, as set forth in claim 1, further comprising a digital cross-connect system interworking unit.

4. The integrated element manager, as set forth in claim 1, further comprising a graphical user interface.

5. The integrated element manager, as set forth in claim 1, wherein the at least one application program interface comprises an application program interface to a frame relay switch.

6. The integrated element manager, as set forth in claim 1, wherein the at least one application program interface comprises an application program interface to a frame relay groomer.

7. The integrated element manager, as set forth in claim 1, wherein the at least one application program interface comprises an application program interface to a digital cross-connect.

8. The integrated element manager, as set forth in claim 1, wherein the at least one application program interface comprises an application program interface to an asynchronous transfer mode switch.

9. The integrated element manager, as set forth in claim 1, further comprising a CMIP/CMISE (common management information protocol/common management information service element) unit operable to exchange network management information.

10. An integrated multi-services access platform, comprising:
    a time division multiplex interface coupled to a time division multiplex network, the time division multiplex interface operable to receive time division multiplex traffic;
    a cross-connect matrix in communications with the time division multiplex interface, the matrix operable to perform switching on the time division multiplex traffic;
    a frame relay groomer coupled to the matrix, the frame relay groomer operable to extract frame relay traffic from the time division multiplex traffic, the frame relay groomer operable to consolidate the frame relay traffic in order to reduce a number of ports needed for traffic transfer;
    an asynchronous transfer mode matrix coupled to the frame relay groomer, the asynchronous transfer mode matrix operable to perform switching of asynchronous transfer mode cells carrying the consolidated frame relay traffic; and
    an asynchronous transfer mode interface coupled to a frame relay/asynchronous transfer mode network, the asynchronous transfer mode interface operable to provide the asynchronous transfer cells for transport over the frame relay/asynchronous transfer mode network.

11. The integrated multi-services access platform, as set forth in claim 10, further comprising time division multiplex-packet interworking units operable to interwork time division multiplex traffic with other packet formats.

12. The integrated multi-services access platform, as set forth in claim 10, further comprising an integrated element manager operable to provide control and management of the time division multiplex interface, the cross-connect matrix, frame relay groomer, the asynchronous transfer mode matrix, and the asynchronous transfer mode interface.

13. The integrated multi-services access platform, as set forth in claim 12, wherein the integrated element manager comprises:
    a centralized management system coupled to a time division multiplex operational support system, the centralized management system operable to provide control and management of a time division multiplex network for transfer of telecommunications traffic over a physical plane according to the time division multiplex operational support system;
    a frame relay/asynchronous transfer mode network management system interworking unit coupled to at least one frame relay/asynchronous transfer mode network management system, the frame relay/asynchronous transfer mode network management system operable to provide control and management of the telecommunications traffic over a logical plane;

an element management function unit operable for service provisioning, fault management, element and network monitoring, and metric measurements of the telecommunications traffic;

an element management database having service and network configurations, status, and billing information for use by the element management function unit;

a simple network management protocol unit operable to provide interfacing for the telecommunications traffic between the time division multiplexed network and the frame relay/asynchronous transfer mode network; and at least one application program interface coupled to at least one telecommunications element and operable to control grooming and multiplexing of the telecommunications traffic in order to reduce a number of required ports.

14. The integrated multi-services access platform, as set forth in claim 13, further comprising a network element communications protocol converter.

15. The integrated multi-services access platform, as set forth in claim 13, further comprising a digital cross-connect system interworking unit.

16. The integrated multi-services access platform, as set forth in claim 13, further comprising a graphical user interface.

17. The integrated multi-services access platform, as set forth in claim 13, wherein the at least one application program interface comprises an application program interface to a frame relay switch.

18. The integrated multi-services access platform, as set forth in claim 13, wherein the at least one application program interface comprises an application program interface to a frame relay groomer.

19. The integrated multi-services access platform, as set forth in claim 13, wherein the at least one application program interface comprises an application program interface to a digital cross-connect.

20. The integrated multi-services access platform, as set forth in claim 13, wherein the at least one application program interface comprises an application program interface to an asynchronous transfer mode switch.

21. The integrated multi-services access platform, as set forth in claim 13, further comprising a CMIP/CMISE (common management information protocol/common management information service element) unit operable to exchange network management information.

22. The integrated multi-services access platform, as set forth in claim 13, further comprising a simple network management protocol agent operable to implement a protocol for network management.

* * * * *